United States Patent
Hall et al.

(10) Patent No.: US 10,155,618 B2
(45) Date of Patent: Dec. 18, 2018

(54) AIR HOSE ACCESSORY STORAGE APPARATUS

(71) Applicants: David R. Hall, Provo, UT (US); Joe Fox, Spanish Fork, UT (US); Jerome Miles, Spanish Fork, UT (US); Corey Webb, Spanish Fork, UT (US)

(72) Inventors: David R. Hall, Provo, UT (US); Joe Fox, Spanish Fork, UT (US); Jerome Miles, Spanish Fork, UT (US); Corey Webb, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 84 days.

(21) Appl. No.: 15/488,062

(22) Filed: Apr. 14, 2017

(65) Prior Publication Data

US 2018/0297774 A1    Oct. 18, 2018

(51) Int. Cl.
  *B65D 77/24* (2006.01)
  *B65D 85/68* (2006.01)
  *F16L 3/10* (2006.01)
  *B65D 25/10* (2006.01)

(52) U.S. Cl.
  CPC .............. *B65D 85/68* (2013.01); *B65D 25/10* (2013.01); *F16L 3/1075* (2013.01); *B65D 2585/6897* (2013.01)

(58) Field of Classification Search
  USPC ............ 206/216, 372, 373, 527; 248/75, 89, 248/316.1, 224.8
  See application file for complete search history.

(56) References Cited

U.S. PATENT DOCUMENTS

| | | | | |
|---|---|---|---|---|
| 2,725,208 A | * | 11/1955 | Bova | F16L 3/02 248/214 |
| 5,421,457 A | * | 6/1995 | Listenberger | B65D 85/04 174/50 |
| 6,095,462 A | * | 8/2000 | Morgan | F16L 3/003 248/316.4 |
| 2005/0051441 A1 | * | 3/2005 | Lamar | B25H 3/00 206/0.6 |
| 2006/0157629 A1 | * | 7/2006 | Silverman | A47F 5/0807 248/310 |
| 2007/0227922 A1 | * | 10/2007 | Chappell | A63B 71/0036 206/315.1 |
| 2008/0073237 A1 | * | 3/2008 | Jackson | B05B 15/00 206/457 |
| 2011/0068022 A1 | * | 3/2011 | Koch, III | A47F 5/04 206/216 |
| 2012/0080579 A1 | * | 4/2012 | Francis | F16M 11/28 248/404 |

(Continued)

*Primary Examiner* — Jacob K Ackun

(57) ABSTRACT

Embodiments of an air hose accessory storage apparatus are described herein. Various embodiments may include a hose clamp, an accessory mount, a housing, and one or more accessory fittings. The accessory mount may be connected to the hose clamp. The housing may be connected to one or more of the hose clamp and the accessory mount. The housing may include at least one fixed segment, at least one articulating segment, and one or more hinges connecting the articulating segment and the fixed segment. The one or more accessory fittings may correspond to one or more air hose accessories. The one or more accessory fittings may be connected to the accessory mount, the housing, or both. The housing may enclose the accessory fittings.

20 Claims, 11 Drawing Sheets

(56) References Cited

U.S. PATENT DOCUMENTS

| | | | | |
|---|---|---|---|---|
| 2013/0014342 A1* | 1/2013 | Greer | ............... | A47L 5/362 15/415.1 |
| 2014/0201976 A1* | 7/2014 | Erlenbach | ............ | B25H 5/00 29/525.01 |

\* cited by examiner

AIR HOSE ACCESSORY STORAGE APPARATUS

TECHNICAL FIELD

This invention relates generally to the field of inflators and air compressors and more specifically to accessories for such devices.

BACKGROUND

Compact inflators are essential tools for the at-home garage tool collection. Despite this, little improvement has been made to inflators considering the amount of time such tools have been on the market and the usefulness of such tools. However, one manufacturer of at-home inflators has leveraged advances in communications technology to revolutionize compact inflators. Such inflators are quieter, more easily controlled, and can be placed in convenient, out-of-the way places. However, this has created a problem for storing accessories for use with the inflators. Some previous solutions included special cases for accessories, but such cases may need to be stored somewhere other than with the inflator, which may be inconvenient. Some solutions include storing the accessories on the inflator, but this similarly reduces the convenience of storing the inflator in an out-of-the-way place. Thus, there is room for improvement in storing and accessing inflator accessories.

SUMMARY OF THE INVENTION

Embodiments of an air hose accessory storage apparatus are described herein that address at least some of the problems described above in the Background. Various embodiments may include a hose clamp, an accessory mount, a housing, and one or more accessory fittings. The accessory mount may be connected to the hose clamp. The housing may be connected to one or more of the hose clamp and the accessory mount. The housing may include at least one fixed segment, at least one articulating segment, and one or more hinges connecting the articulating segment and the fixed segment. The one or more accessory fittings may correspond to one or more air hose accessories. The one or more accessory fittings may be connected to the accessory mount, the housing, or both. The housing may enclose the accessory fittings.

BRIEF DESCRIPTION OF THE DRAWINGS

A more particular description of the apparatus summarized above is made below by reference to specific embodiments. Several embodiments are depicted in drawings included with this application, in which.

DETAILED DESCRIPTION

Figure 1A:
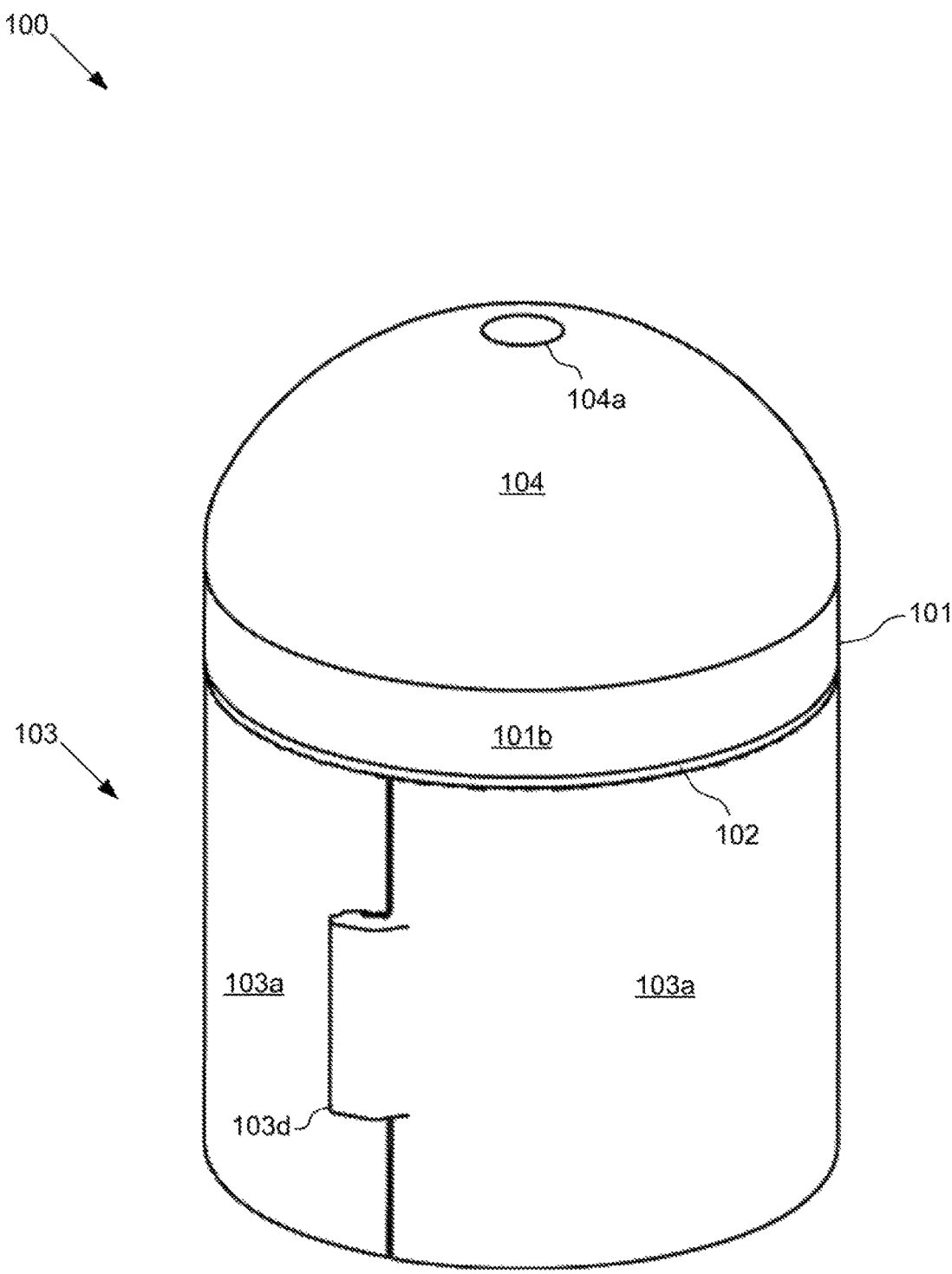
FIGS. 1A-D depict various external views of one embodiment of an air hose accessory storage apparatus.

A detailed description of embodiments of an air hose accessory storage apparatus is provided below by example. Various embodiments in the appended figures are provided to facilitate understanding of the detailed description. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed. Embodiments not depicted but otherwise described below and/or in the appended claims are also envisioned, as is recognized by those of skill in the art.

Embodiments of an air hose accessory storage apparatus are described herein. Various embodiments may include a hose clamp, an accessory mount, a housing, and one or more accessory fittings. The accessory mount may be connected to the hose clamp. The housing may be connected to one or more of the hose clamp and the accessory mount. The housing may include at least one fixed segment, at least one articulating segment, and one or more hinges connecting the articulating segment and the fixed segment. The one or more accessory fittings may correspond to one or more air hose accessories. The one or more accessory fittings may be connected to the accessory mount, the housing, or both. The housing may enclose the accessory fittings.

The air hose accessory storage apparatus may store one or more air hose accessories. Such accessories may connect to the air hose by one or more air hose fittings directly connected to the air hose. Air hose fittings may include one or more of a female and/or male valve stem coupler, a quick coupler plug, a quick coupler body, a threaded hose barb, an elbow fitting, an externally and/or internally threaded fitting, a universal coupling, a reusable hose end, a ferrule, a flex fitting, a union, a swivel connector, a straight beaded hose barb, or combinations thereof, among others. The accessories that connect to the air hose fitting may include blower nozzles, throttled and/or valve blower nozzles, constrictor nozzles, needle nozzles, barbed nozzles, or combinations thereof, among others. The accessories may couple to the air hose fitting by threading and/or one or more quick-connect ends.

Components of the air hose accessory storage apparatus may be formed of a variety of materials. Such materials may include thermoplastics such as ABS, acrylic, PLA, polybenzimidazole, polycarbonate, polyether sulfone, polyetherether ketone, polyetherimide, polyphenylene oxide, polyphenylene sulfide, polypropylene, Teflon, PVC, Nylon, polyethylene, and/or polystyrene, various metals such as aluminum, steel, copper, and/or brass, and/or various composite materials including carbon fiber and/or fiberglass. Such materials may also include various combinations of the aforementioned materials.

An air hose to which the air hose accessory storage compartment may be connected may be comprised of one or more flexible materials that allow the hose to flex during use. For example, the hose may be comprised of one or more of nylon, polyurethane, polyethelene, PVC, or one or more natural and/or synthetic rubbers. In various embodiments, the hose may be reinforced with one or more fibers and/or steel cord. A static coefficient of friction between the hose and the hose clamp as the hose clamp is clamped to the hose may range from 0.85 to 1.

The hose clamp may directly connect the air hose accessory storage apparatus to the air hose. The hose clamp may include any of a variety of clamps or combinations of clamps, including screw/band clamps, spring clamps, spring-loaded clamps, wire clamps, ear clamps, compression clamps, push-fit clamps, swage clamps, crimp banding, or combinations thereof, among others. Such clamps may be off-the-shelf, or built-to-suit. Some built-to-suit clamps may, for example, include a button segment, a slotted segment, and one or more springs. The slotted segment may include a slot corresponding to the button segment. The one or more springs may be disposed between the button segment and the slotted segment. The button segment may be disposed in the slot. Each segment may include parallel hose openings that are misaligned by a force exerted on each by the springs such that the openings are non-coaxial. The air hose may pass through the hose openings and may couple the button segment to the slotted segment. The hose opening in the button segment may be elongated. This may allow a user to compress the springs by pressing on the button and slotted segments. The pressure on the segments by the spring that misaligns the hose openings may force inside edges of the openings against the hose and pin the hose between the two segments. When the springs are compressed, such as by a user pressing the button segment into the slotted segment, the pressure may be significantly reduced. The spring constant of the springs may be large enough to raise the coefficient of static friction between the segments and the air hose to 1, and the air hose may have a circumferential rigidity high enough to prevent the air hose from collapsing by the force exerted on the hose by the clamp. When the springs are compressed, the static friction coefficient may be reduced to as low as a range from 0 to 0.5.

The clamp may be connected to the accessory mount in a variety of ways. In some embodiments, such as those that include the slotted and button segments, the slotted segment may be fixed to the accessory mount by one or more screws. In some embodiments, the slotted segment and the accessory mount may be monolithic.

The air hose accessory storage apparatus may comprise one or more of a variety of shapes. Such shapes may correspond to one or more various functions performed by the accessory storage apparatus. In various embodiments, one or more of the hose clamp, the accessory mount, and the housing are cylindrical, spherical, cuboid, polygonal, or combinations thereof.

The accessory mount may, in various embodiments, be formed as a separate piece from the hose clamp, and may be connected to the hose clamp. In some embodiments, the accessory mount may include a hose opening passing through the accessory mount. For example, the accessory mount hose opening may be aligned with the opening in the hose clamp through which the hose passes. In the segmented embodiment of the hose clamp described above, the accessory mount hose opening may be coaxial with the slotted segment hose opening and may be misaligned with the button segment hose opening. This may provide additional static friction that secures the air hose accessory storage apparatus to the air hose.

Similar to the clamp and the accessory mount, the housing may include one or more hose openings passing through the housing. In some embodiments, the housing may include an enclosed hose channel passing through the housing. The hose channel may segregate an interior portion of the channel from the accessory fittings.

The fixed segment may be fixed to one or more of the accessory mount and the hose clamp. The fixed segment may form a wall of the housing. The articulating segment may form a remaining portion of the housing. The articulating segment may be connected to the fixed segment at one end by the hinge and at another end by a latch.

The housing may include two articulating segments and two hinges. The articulating segments may be connected to the fixed segment by the hinges, and may be connected to each other by a latch. Each articulating segment may include a semi-cylindrical wall perpendicularly connected to a semi-circular floor. The semi-circular floor may be disposed opposite the accessory mount, the semi-cylindrical walls extending between the floors and the accessory mount. Each semi-circular floor may include a semi-circular hose opening. The semi-circular hose openings may be aligned such that as the articulating segments are closed to form a cylinder, the two semi-circular hose openings form a circular hose opening. In some embodiments, each articulating segment may include a semi-cylindrical outer wall and a semi-cylindrical inner wall. The walls may be connected to the semi-circular floors. The inner walls may form a hose channel, and the outer walls may form an accessory storage compartment.

The accessory fittings may hold the accessories to one or more surfaces within the air hose accessory storage apparatus. The accessory fittings may be connected to and/or incorporated with the accessory mount, the housing, and/or the hose clamp. At least one of the accessory fittings may include a cylindrical tube and one or more inward-facing, deflectable detents, an internally-threaded cylindrical tube, an accessory-shaped contour formed in a surface of the accessory mount, an opening formed in the accessory mount, a c-shaped prong, a contour having a portion of a width narrower than a corresponding portion of an accessory, or combinations thereof. In some embodiments, the accessory fittings may mimic the means by which one or more of the accessories couple to the air hose fittings. For example, at least one of the accessory fittings may correspond to an accessory base that connects to the air hose fittings. The accessory base may form a plug, and the accessory fitting may form a complementary body that fits around the plug. The accessory base may form a body that fits around a plug formed by the accessory fitting. The accessory may include a nozzle, and the accessory fitting may correspond to a shape of the nozzle. The nozzle may fit into a cavity formed by the accessory fitting, the cavity having a shape corresponding to the shape of the nozzle. In some embodiments, the accessory fitting corresponds to the accessory base and the accessory nozzle. For example, the accessory fitting may comprise a contour formed in the accessory mount. The contour may form a partial outline of the accessory. The contour may include one or more detents that secure the accessory in the accessory fitting.

In some embodiments, the accessory fitting may be directly connected to the accessory mount. In some embodiments, the accessory fitting may be connected directly to an interior wall of the housing, an interior floor of the housing, or both. The interior wall may be an inside surface of an outer wall or in outer surface of an internal wall, such as a wall forming a hose channel passing through the housing.

The air hose accessory storage apparatus may include a stop. In various embodiments where the air hose is connected to an automated and/or spring-loaded reel, the stop may prevent over-reeling of the air hose and/or may dampen the impact of the air hose accessory storage apparatus against the reel and/or inflator. The storage apparatus may be positioned on the air hose to leave a portion of the air hose extended from the reel to simplify grasping the air hose and pulling it from the reel. The stop may be formed of the same material/materials as the storage apparatus, and/or may be formed at least partially of a rubberized material. The stop may be connected to one or more of the hose clamp, the accessory mount, and/or the housing. The stop may have a width greater than or equal to an outer width of one or more of the hose clamp, the accessory mount, and the housing. For example, one or more of the hose clamp, the accessory mount and the housing may have a diameter ranging from two inches to six inches. The corresponding stop may have a diameter ranging from two inches to eight inches. In a specific embodiment, the hose clamp has a diameter of between 3¾" and 4¼", and the stop has a diameter ranging from 4½" to 5". The stop may have a surface corresponding to one or more of the hose clamp, the accessory mount and the housing, and a surface corresponding to one or more of the reel and the inflator housing. For example, the stop may include a semi-spherical surface and a flat surface. The flat surface may be connected to one or more of the hose clamp, the accessory mount, and the housing.

Various specific embodiments of the air hose storage apparatus described herein are depicted in the appended FIGs. and described below regarding the FIGs.

Figure 1B:
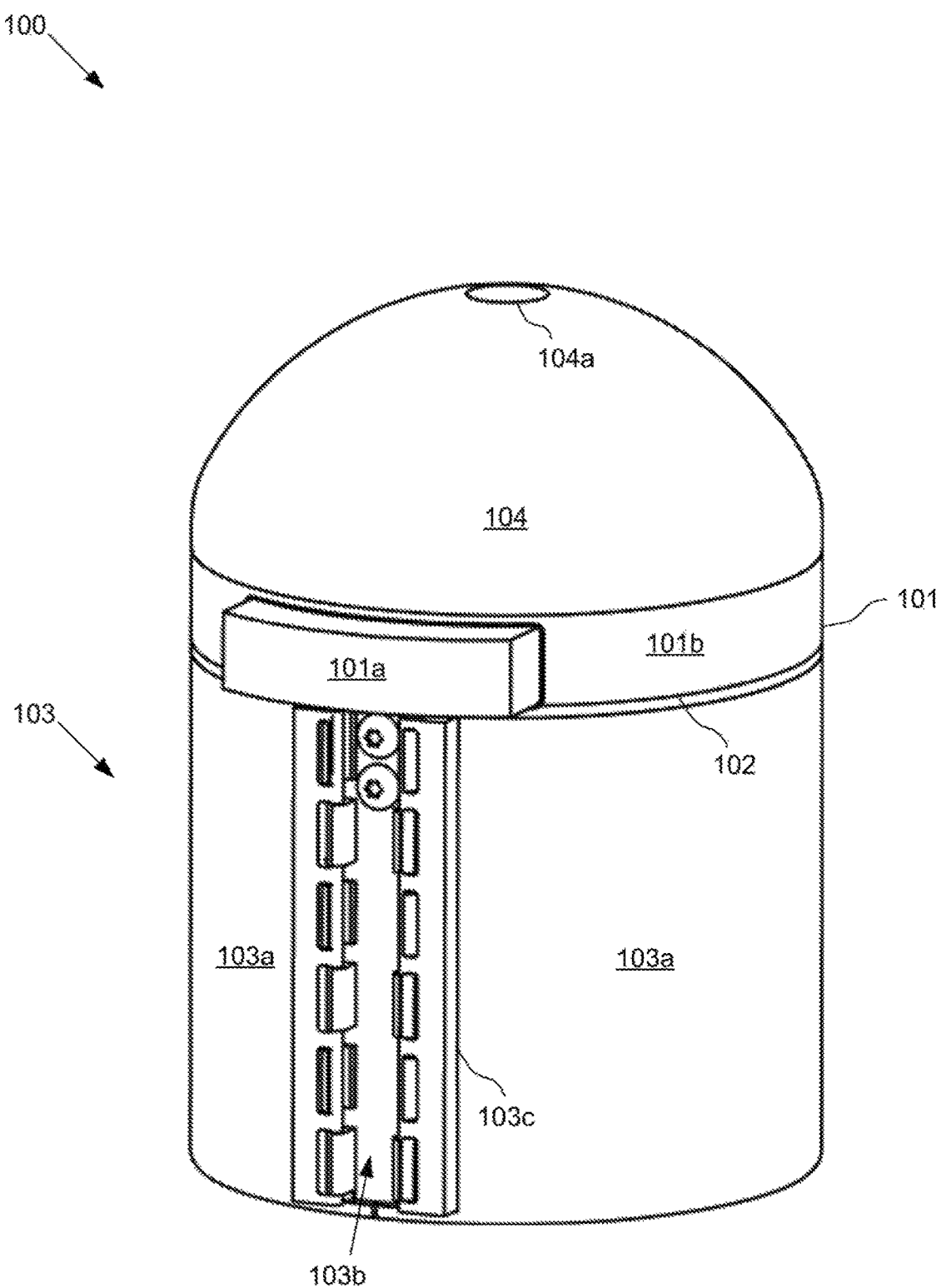
Figure 1C:
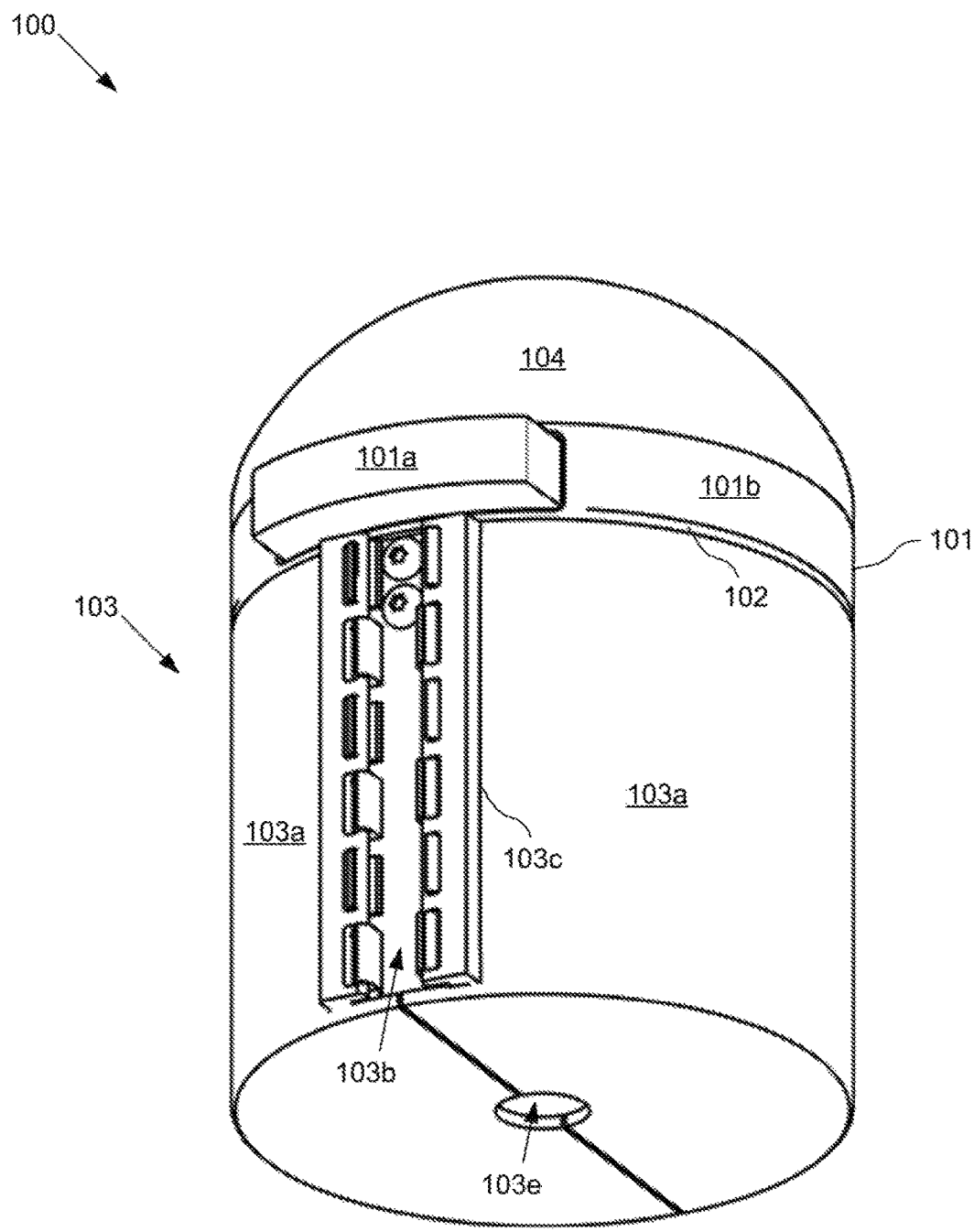
Figure 1D:
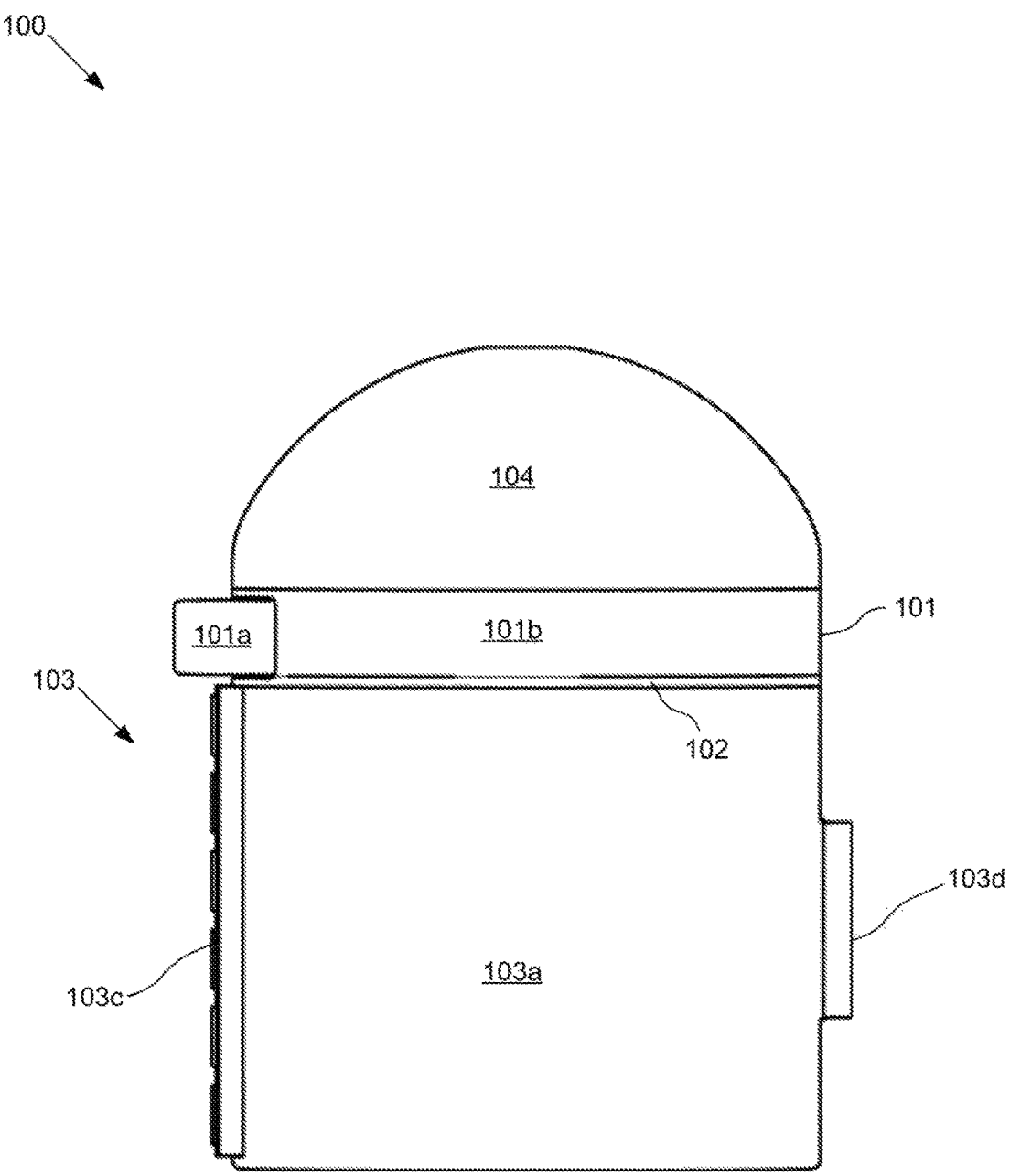

FIGS. 1A-D depict various external views of one embodiment of an air hose accessory storage apparatus. FIG. 1A is a front isometric view. FIG. 1B is a back isometric view. FIG. 1C is a bottom isometric view. FIG. 1D. is a side view. The air hose accessory storage apparatus 100 includes a hose clamp 101 with a button segment 101a and a slotted segment 101b, an accessory mount 102, a housing 103 with two articulating segments 103a, a fixed segment 103b, two hinges 103c, a latch 103d and a hose opening 103e, and a stop 104 with a hose opening 104a.

Figure 2A:
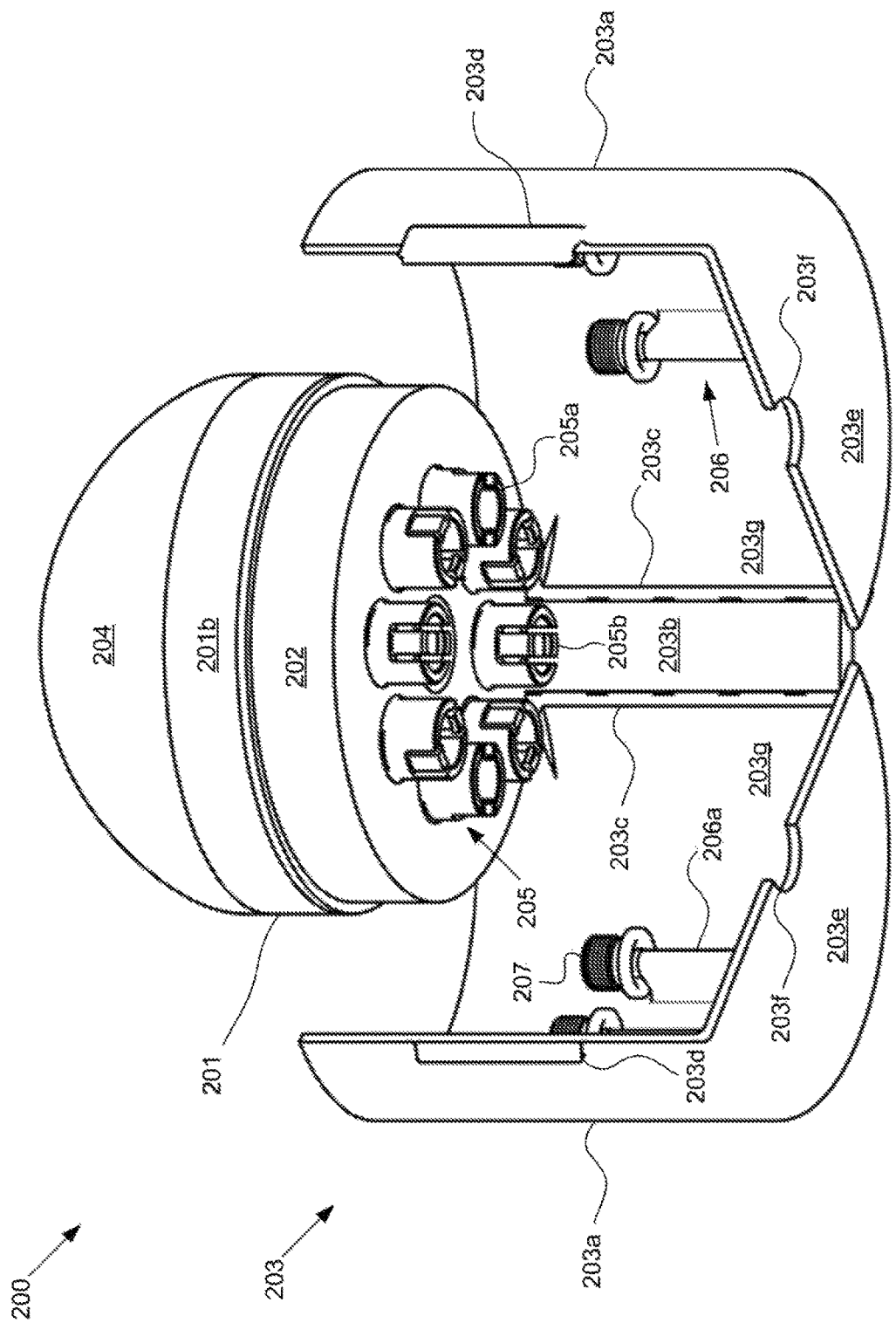
FIGS. 2A-B depict a front and a back view of an embodiment of an air hose accessory storage apparatus.
Figure 2B:
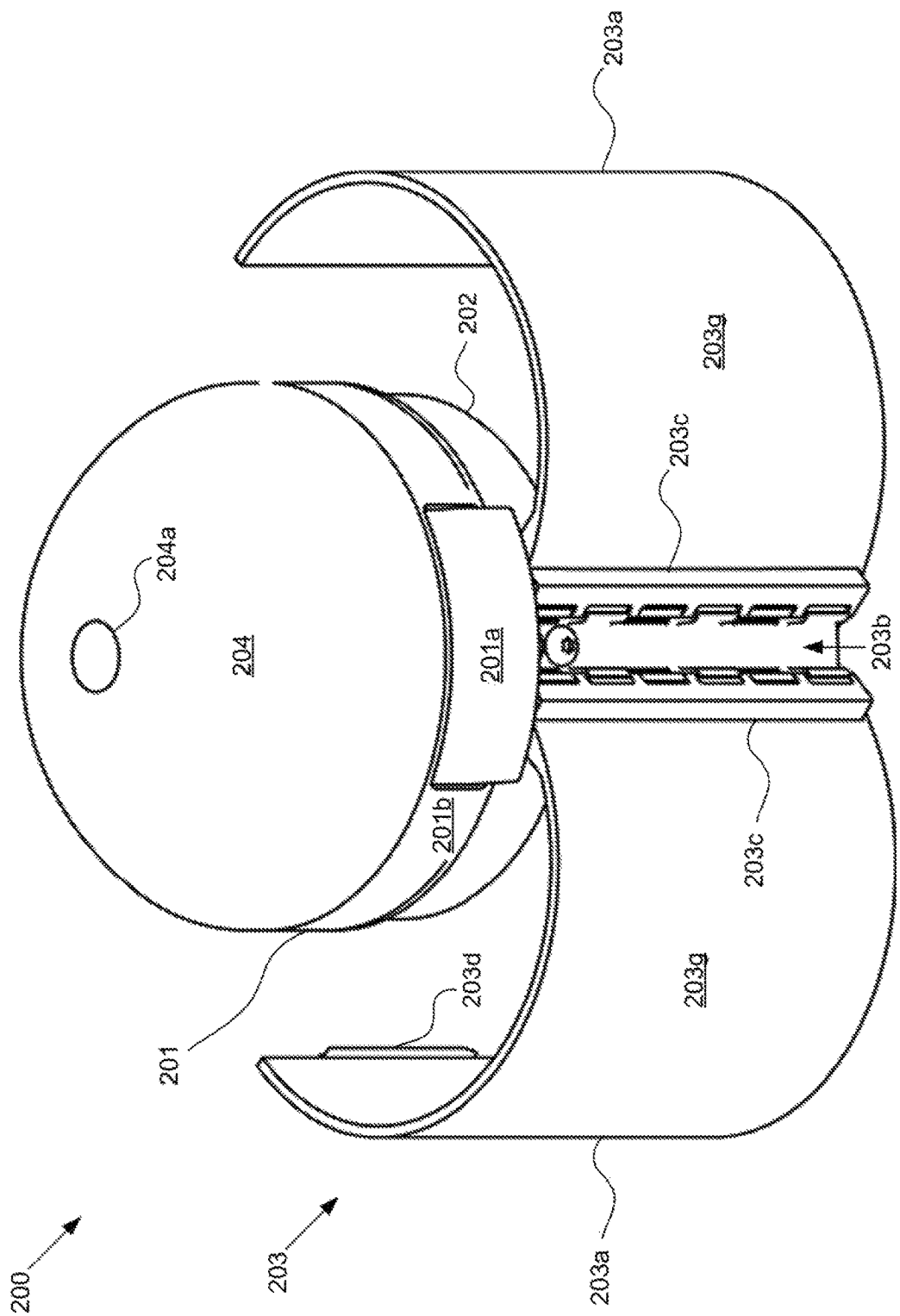

FIGS. 2A-B depict a front and a back view of an embodiment of an air hose accessory storage apparatus. FIG. 2A is a front isometric view. FIG. 2B is a back isometric view. The air hose accessory storage apparatus 200 includes a hose clamp 201 with a button segment 201a and a slotted segment 201b, an accessory mount 202, a housing 203 with two articulating segments 203a, a fixed segment 203b, two hinges 203c, a latch 203d, a stop 204 with a hose opening 204a, a plurality of accessory fittings 205 that are monolithic with the accessory mount, a plurality of accessory fittings 206 that are monolithic with the housing, and accessories 207. The articulating segments each include a semi-circular base 203e, a semi-circular hose opening 203f, and a semi-cylindrical wall 203g. The accessory fittings monolithic with the accessory mount include cylindrical tubes 205a and deflectable detents 205b. The accessory fittings monolithic with the housing include tubes 206a.

Figure 3:
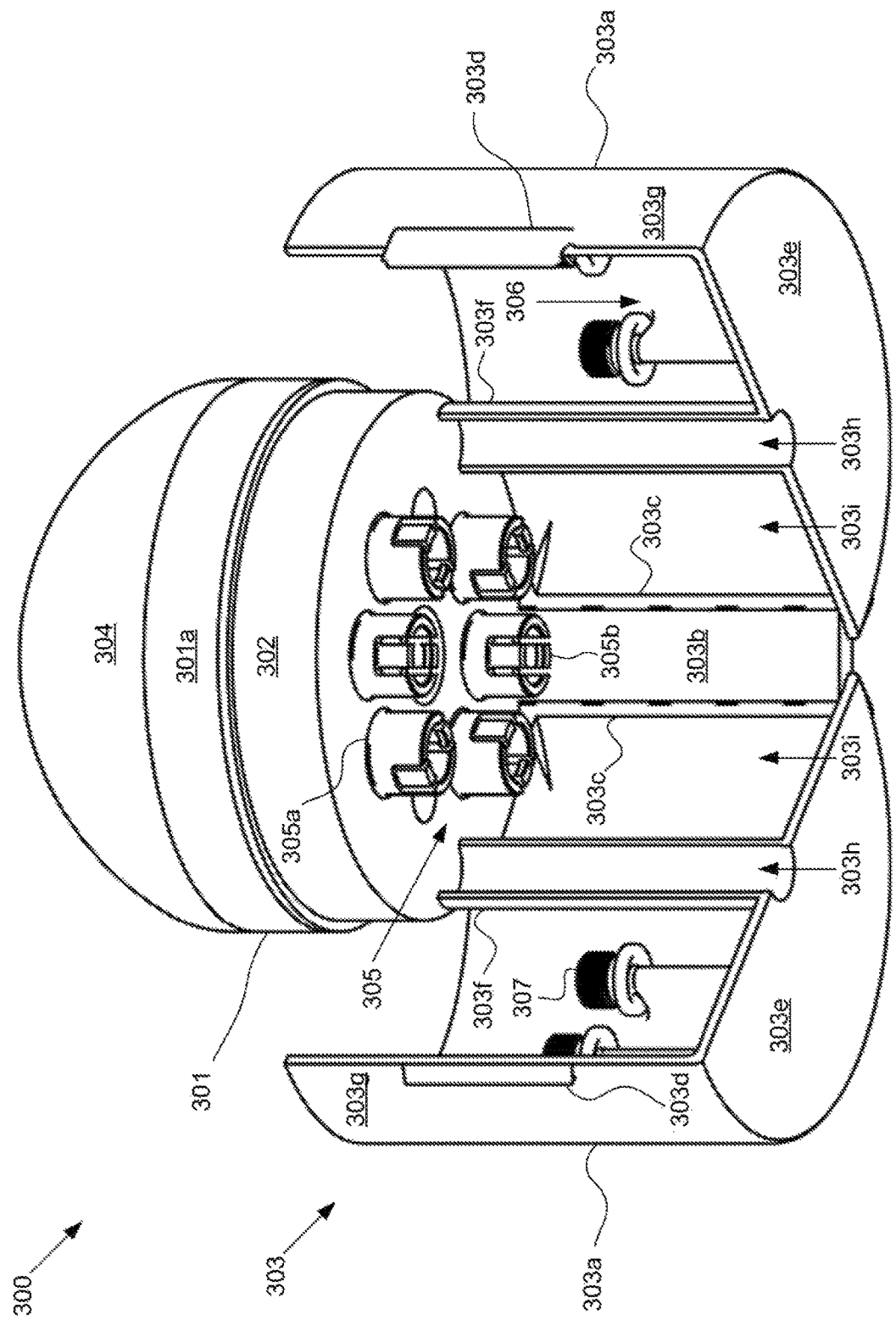
FIG. 3 depicts an embodiment of an air hose accessory storage apparatus with a hose channel.

FIG. 3 depicts an embodiment of an air hose accessory storage apparatus with a hose channel. The air hose accessory storage apparatus 300 includes a hose clamp 301 with a button segment (not shown) and a slotted segment 301a, an accessory mount 302, a housing 303 with two articulating segments 303a, a fixed segment 303b, two hinges 303c and a latch 303d, a stop 304, a plurality of accessory fittings 305 that are monolithic with the accessory mount, a plurality of accessory fittings 306 that are monolithic with the housing, and accessories 307. The articulating segments each include a semi-circular base 303e, a semi-cylindrical inner wall 303f, and a semi-cylindrical outer wall 303g. As the two articulating segments come together, the inner walls come together to form a hose channel 303h, and the outer walls come together to form an accessory storage compartment 303i. The accessory fittings monolithic with the accessory mount include cylindrical tubes 305a and deflectable detents 305b.

Figure 4:
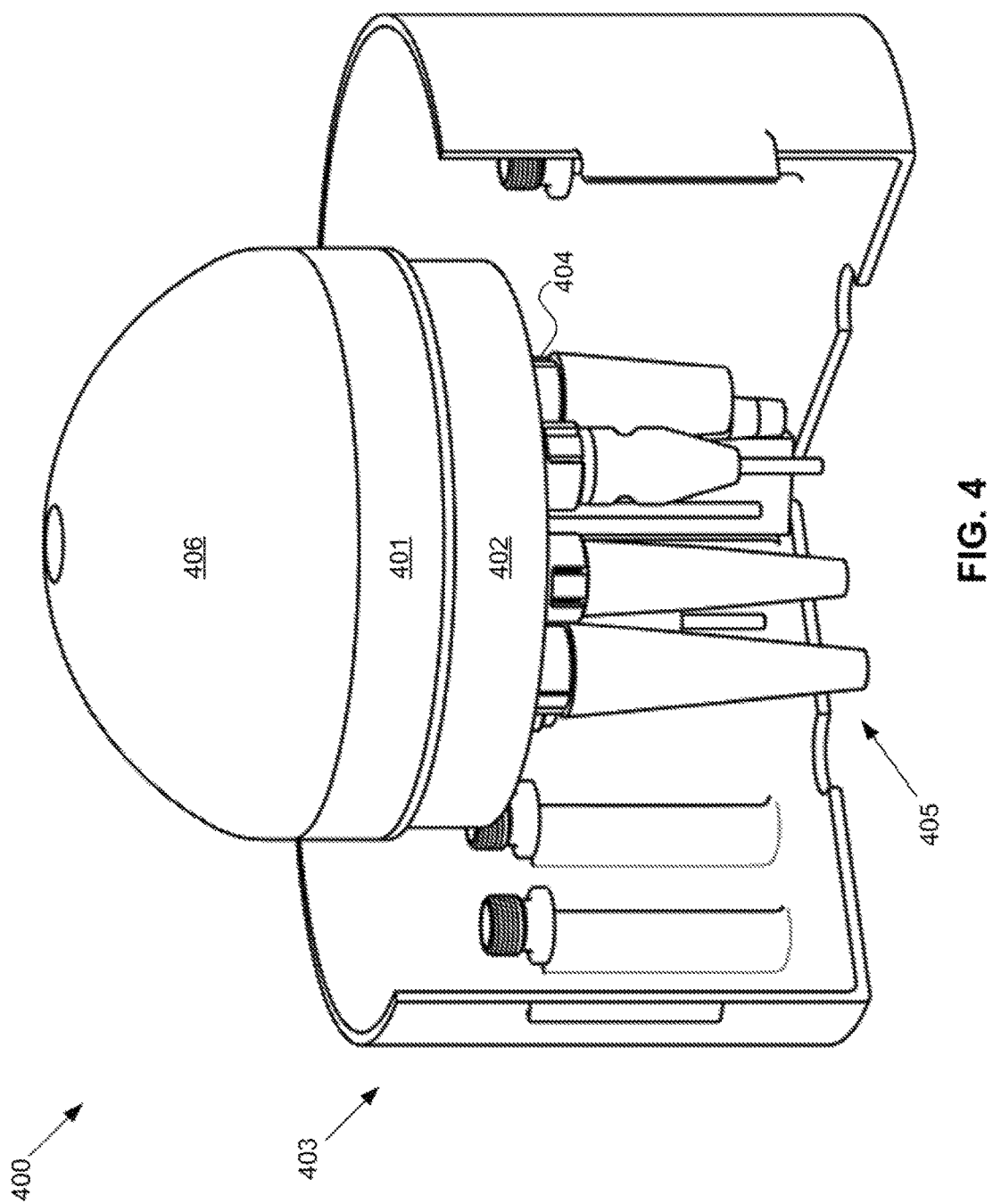
FIG. 4 depicts an embodiment of an air hose accessory storage apparatus with various accessories connected to accessory fittings in the apparatus.

FIG. 4 depicts an embodiment of an air hose accessory storage apparatus with various accessories connected to accessory fittings in the apparatus. The air hose accessory storage apparatus 400 includes a hose clamp 401, an accessory mount 402, a housing 403, a plurality of accessory fittings 404, a plurality of accessories 405, and a stop 406.

Figure 5:
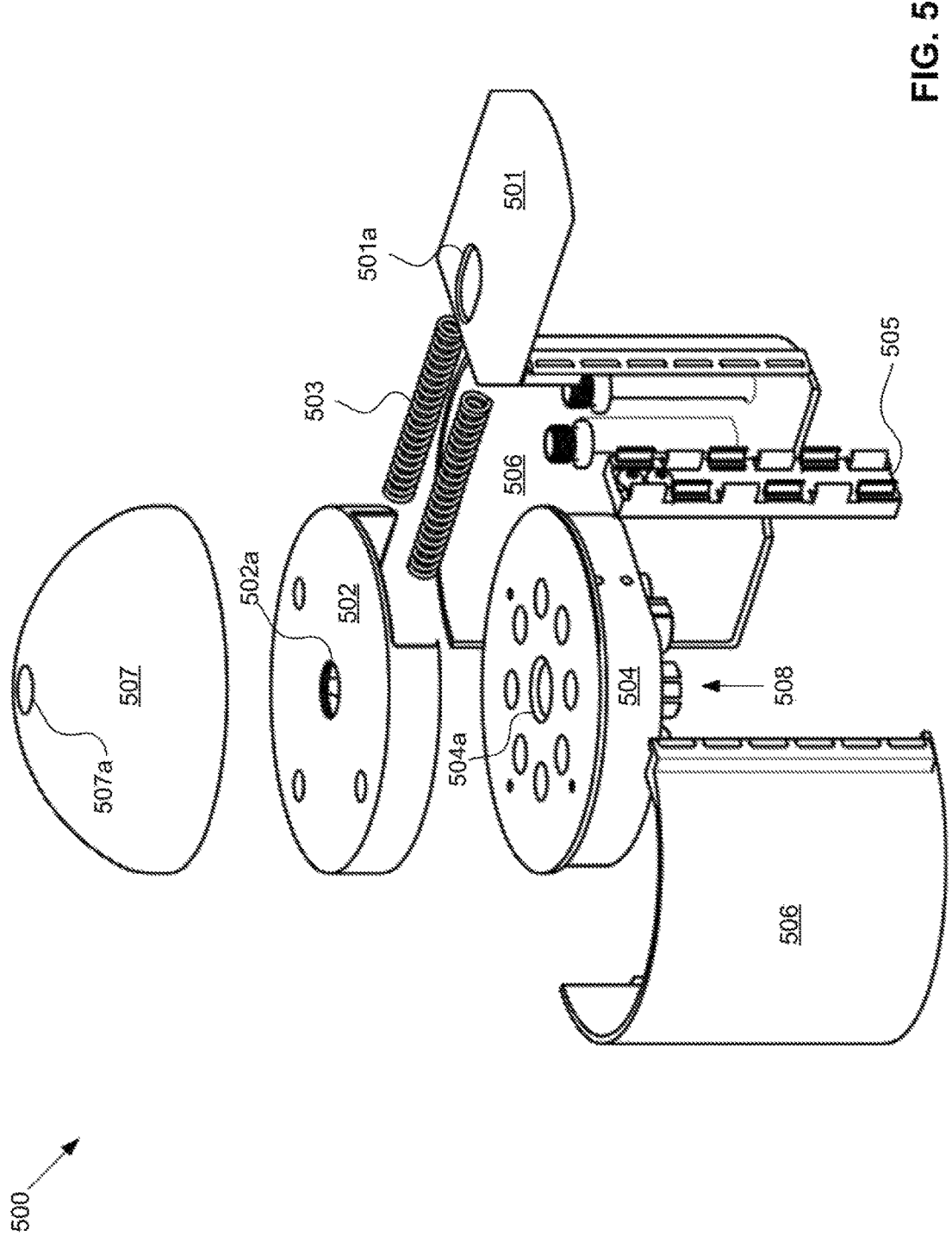
FIG. 5 depicts an exploded view of an embodiment of an air hose accessory storage apparatus.

FIG. 5 depicts an exploded view of an embodiment of an air hose accessory storage apparatus. The air hose accessory storage apparatus 500 includes a hose clamp button segment 501, a hose clamp slotted segment 502, hose clamp springs 503, an accessory mount 504, a housing fixed segment 505, two housing articulating segments 506, a stop 507, and a plurality of accessory fittings 508. The button segment includes an elongated hose opening 501a, and the slotted segment includes a circular hose opening 502a. The accessory mount includes a circular hose opening 504a, and the stop includes a circular hose opening 507a. The springs press on the slotted and button segments in opposing directions, pinning a hose that may pass through the hose openings between the button segment and the slotted segment. A user may compress the springs by pressing the button and slotted segments together, thus releasing the hose and allowing it to slide freely in the openings.

Figure 6:
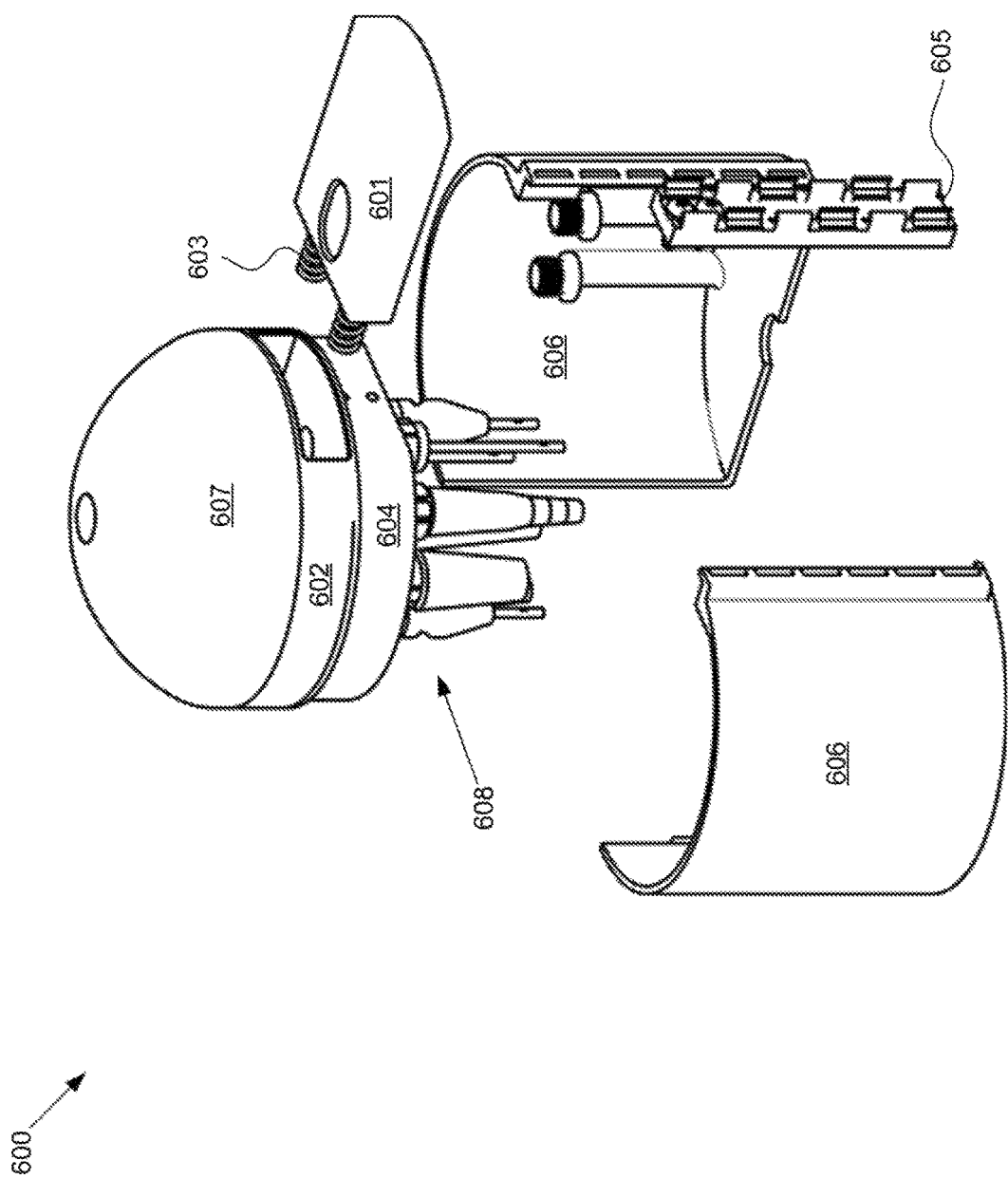
FIG. 6 depicts an exploded view of an embodiment of an air hose accessory storage apparatus with a monolithic accessory mount and slotted segment.

FIG. 6 depicts an exploded view of an embodiment of an air hose accessory storage apparatus with a monolithic accessory mount and slotted segment. The air hose accessory storage apparatus 600 includes a hose clamp button segment 601, the hose clamp slotted segment 602, hose clamp springs 603, the accessory mount 604, a housing fixed segment 605, two housing articulating segments 606, a stop 607, and a plurality of accessory fittings 608. As depicted, the slotted segment and the accessory mount are formed of a single piece formed from a single plastic injection mold.

Figure 7:
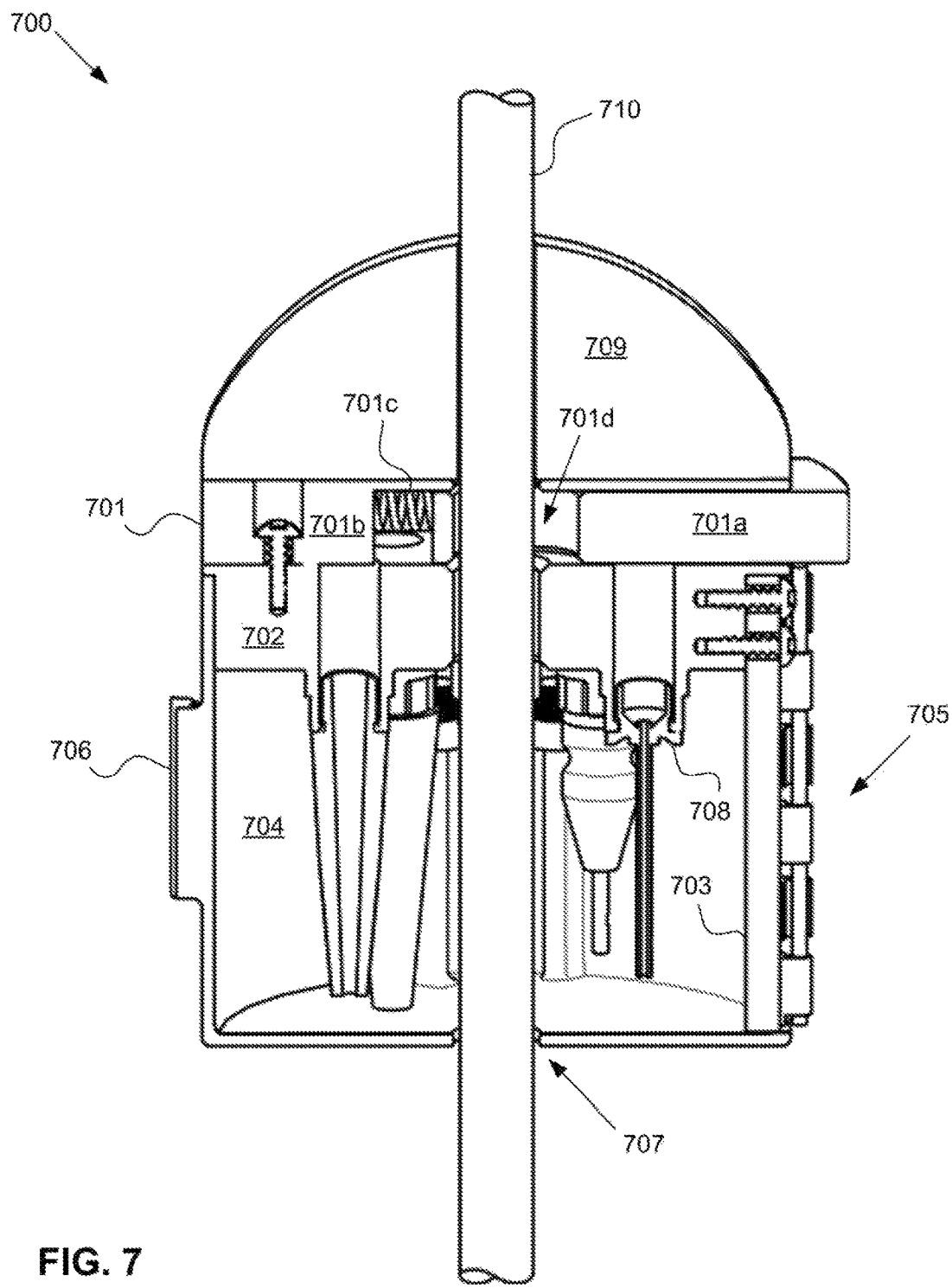
FIG. 7 depicts a cross-sectional view of an embodiment of an air hose accessory storage apparatus.

FIG. 7 depicts a cross-sectional view of an embodiment of an air hose accessory storage apparatus. The air hose accessory storage apparatus 700 includes a hose clamp 701 with a button segment 701a, a slotted segment 701b, springs 701c and a hose opening 701d, an accessory mount 702, a housing fixed segment 703, a housing articulating segment 704, a hinge 705, a latch 706, a housing hose opening 707, a plurality of accessory fittings 708, a stop 709, and a hose 710. The hose passes through each of the housing, the accessory mount, the clamp, and the stop. As depicted, the clamp springs are compressed to allow the hose to slide through the openings.

We claim:

1. An air hose accessory storage apparatus, comprising:
   a hose clamp;
   an accessory mount connected to the hose clamp;
   a housing connected to one or more of the hose clamp and the accessory mount, the housing comprising at least one fixed segment, at least one articulating segment, and one or more hinges connecting the articulating segment and the fixed segment; and
   one or more accessory fittings corresponding to one or more air hose accessories, the one or more accessory fittings connected to the accessory mount, the housing, or both, wherein the housing encloses the accessory fittings.

2. The air hose accessory storage apparatus of claim 1, further comprising a stop connected to the hose clamp, wherein one or more of the hose clamp, the accessory mount and the housing comprises a diameter ranging from two inches to six inches, and wherein the stop comprises a diameter ranging from two inches to eight inches.

3. The air hose accessory storage apparatus of claim 1, further comprising a stop connected to the hose clamp, wherein the stop comprises a semi-spherical surface and a flat surface, the flat surface connected to one or more of the hose clamp, the accessory mount, and the housing.

4. The air hose accessory storage apparatus of claim 1, wherein the hose clamp is spring-loaded, wherein the hose clamp comprises a button segment, a slotted segment comprising a slot corresponding to the button segment, and one or more springs disposed between the button segment and the slotted segment.

5. The air hose accessory storage apparatus of claim 4, wherein the button segment is disposed in the slot, and wherein the button and slotted segments comprise parallel hose openings that are misaligned by the one or more springs such that the openings are non-coaxial.

6. The air hose accessory storage apparatus of claim 5, wherein a hose passing through the hose openings couples the button segment to the slotted segment.

7. The air hose accessory storage apparatus of claim 5, wherein the slotted segment is fixed to the accessory mount by one or more screws.

8. The air hose accessory storage apparatus of claim 5, wherein the slotted segment and the accessory mount are monolithic.

9. The air hose accessory storage apparatus of claim 1, wherein one or more of the hose clamp, the accessory mount, and the housing are cylindrical.

10. The air hose accessory storage apparatus of claim 1, wherein the accessory mount comprises a hose opening passing through the accessory mount.

11. The air hose accessory storage apparatus of claim 1, wherein at least one of the accessory fittings comprises:
a cylindrical tube and one or more inward-facing, deflectable detents;
an internally threaded cylindrical tube;
an accessory-shaped contour formed in a surface of the accessory mount;
an opening formed in the accessory mount;
a c-shaped prong;
a contour having a portion of a width narrower than a corresponding portion of an accessory; or
combinations thereof.

12. The air hose accessory storage apparatus of claim 1, wherein at least one of the accessory fittings corresponds to one or more of an accessory base and an accessory nozzle.

13. The air hose accessory storage apparatus of claim 1, wherein at least one of the accessory fittings is connected directly to an interior wall of the housing, an interior floor of the housing, or both.

14. The air hose accessory storage apparatus of claim 1, wherein the housing further comprises one or more hose openings passing through the housing.

15. The air hose accessory storage apparatus of claim 1, wherein the housing further comprises an enclosed hose channel passing through the housing, wherein the hose channel segregates an interior portion of the channel from the accessory fittings.

16. The air hose accessory storage apparatus of claim 1, wherein the housing comprises two articulating segments and two hinges, and wherein the articulating segments are connected to each other by a latch.

17. The air hose accessory storage apparatus of claim 1, wherein the housing comprises two articulating segments and two hinges, and wherein each articulating segment comprises a semi-cylindrical wall perpendicularly connected to a semi-circular floor.

18. The air hose accessory storage apparatus of claim 17, wherein each semi-circular floor comprises a semi-circular hose opening.

19. The air hose accessory storage apparatus of claim 1, wherein the housing comprises two articulating segments and two hinges, wherein each articulating segment comprises a semi-cylindrical outer wall and a semi-cylindrical inner wall, the walls perpendicularly connected to a semi-circular floor, wherein the inner walls form a hose channel, and wherein the outer walls form an accessory storage compartment.

20. The air hose accessory storage apparatus of claim 1, wherein the fixed segment is fixed to one or more of the accessory mount and the hose clamp.

* * * * *